(12) United States Patent  
Ruprich

(10) Patent No.: US 8,036,657 B2
(45) Date of Patent: Oct. 11, 2011

(54) RADIO COMMUNICATIONS SYSTEM

(75) Inventor: Thomas Ruprich, Munich (DE)

(73) Assignee: Infineon Technologies AG, Neubiberg (DE)

( * ) Notice: Subject to any disclaimer, the term of this patent is extended or adjusted under 35 U.S.C. 154(b) by 716 days.

(21) Appl. No.: 12/129,768

(22) Filed: May 30, 2008

(65) Prior Publication Data

US 2009/0298432 A1  Dec. 3, 2009

(51) Int. Cl.
*H04W 4/00* (2009.01)
*H04K 3/00* (2006.01)

(52) U.S. Cl. .................. 455/434; 455/515; 455/525

(58) Field of Classification Search ............. 455/426.1, 455/434, 515, 525, 552.1
See application file for complete search history.

(56) References Cited

U.S. PATENT DOCUMENTS

2004/0160934 A1* 8/2004 Back .................. 370/342
2006/0079236 A1  4/2006 Del Pino et al.
2008/0081615 A1  4/2008 Ninagawa
2008/0090595 A1  4/2008 Liu et al.
2008/0146226 A1* 6/2008 Claussen et al. ........... 455/435.1

OTHER PUBLICATIONS

3GPP TS 25.211, V8.0.0 (Mar. 2008), $3^{rd}$ Generation Partnership Project; Technical Specification Group Radio Access Network; Physical channels and mapping of transport channels onto physical channels (FDD) (Release 8), pp. 29-36.
3GPP TS 25.213, V8.0.0 (Mar. 2008), $3^{rd}$ Generation Partnership Project; Technical Specification Group Radio Access Network; Spreading and modulation (FDD) (Release 8), pp. 28-31.

* cited by examiner

*Primary Examiner* — Lee Nguyen
(74) *Attorney, Agent, or Firm* — Eschweiler & Associates, LLC

(57) ABSTRACT

A base station is operable in a local area communication radio network within the coverage of a wide area communication radio network. The base station comprises a code generator configured to generate an acquisition code, and a modulator configured to modulate the acquisition code onto an acquisition signal to be broadcast by the base station. The acquisition signal is broadcast over a listening channel of the wide area communication radio network. The acquisition code associated with the local area communication radio network is different from all acquisition codes used by the wide area communication radio network.

18 Claims, 4 Drawing Sheets

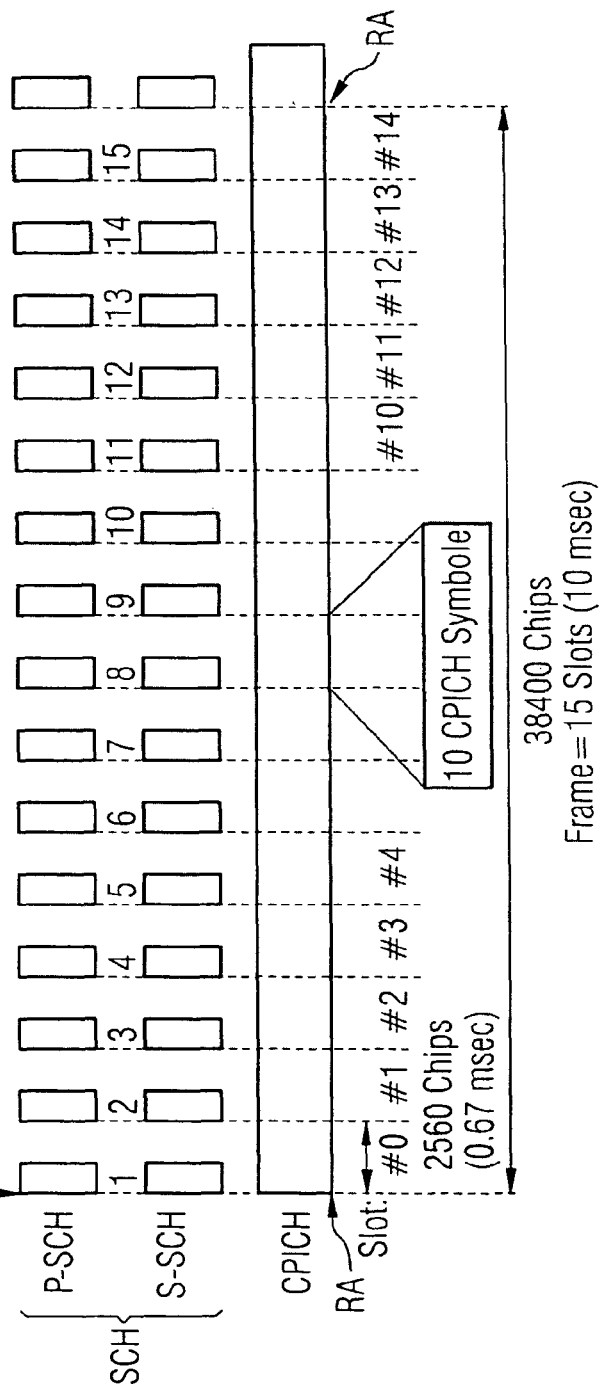

RADIO COMMUNICATIONS SYSTEM

FIELD OF THE INVENTION

The invention relates to radio transmitters, radio receivers and radio communications systems. More specifically, the invention relates to radio communications systems employing an enhanced radio access facility and downward compatibility.

BRIEF DESCRIPTION OF THE DRAWINGS

Aspects of the invention are made more evident by way of example in the following detailed description of embodiments when read in conjunction with the attached drawing figures, wherein

FIG. 5 is a schematic representation of a channel structure of the synchronization channel SCH and the common pilot channel CPICH in the UMTS standard; and FIGS. 6A-6B are embodiments of data structures of a listening channel in a radio communications system.

DETAILED DESCRIPTION OF THE INVENTION

Figure 1:
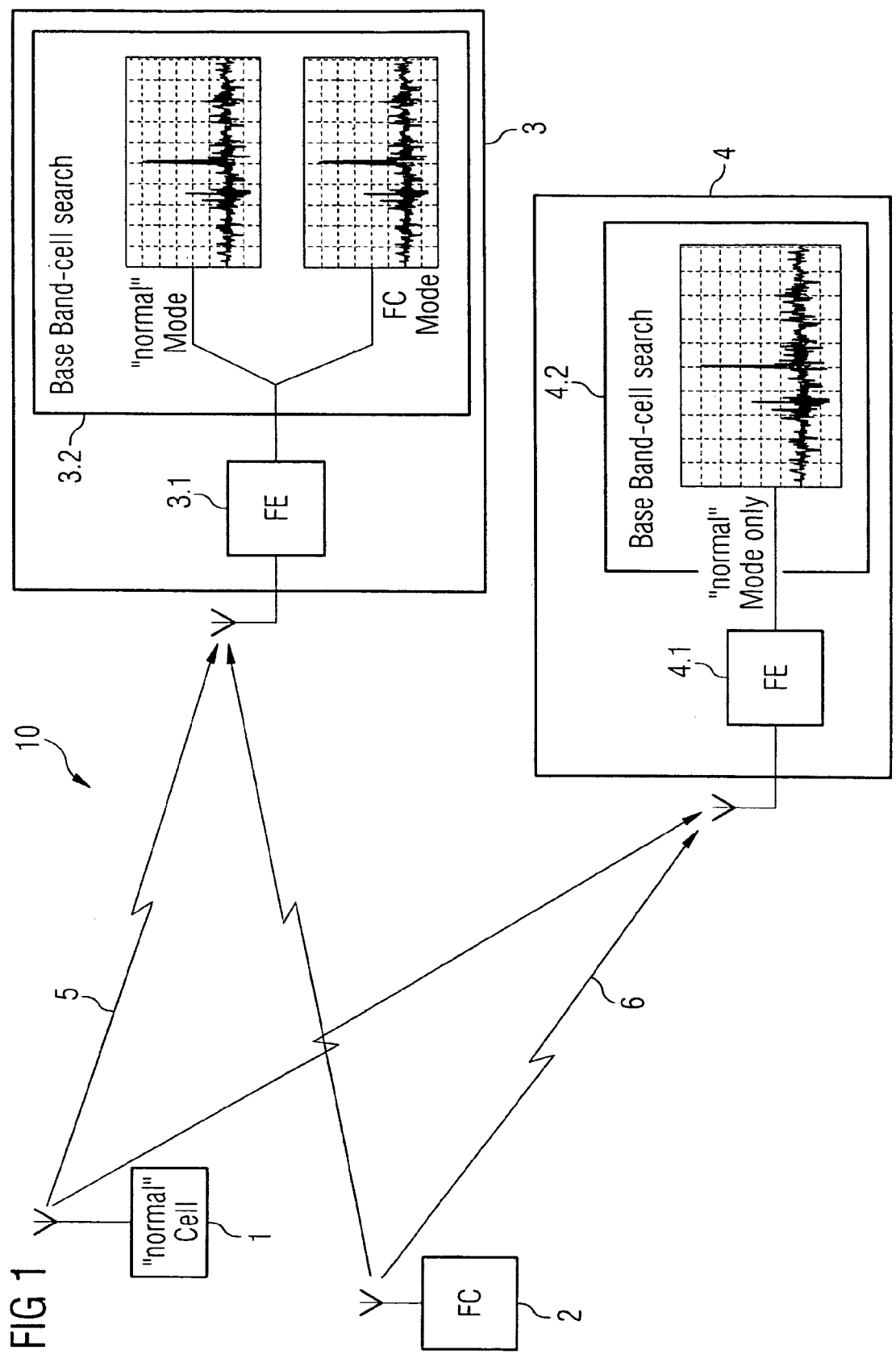
FIG. 1 is a schematic representation of a radio communications system comprising two base stations and two mobile stations.

In the following description and claims, the terms "coupled" and "connected", along with derivatives may be used. It should be understood that these terms may indicate that two elements co-operate or interact with each other regardless whether they are in direct physical or electrical contact or they are not in direct contact with each other.

Cellular wireless networks such as e.g. those used in mobile radio communications systems or other applications use base stations (i.e. radio transmitters) to provide for cellular radio coverage. Mobile stations, also referred to as user equipment (UE), are configured to synchronize to the base stations in order to establish and maintain a communication link.

Wireless communication networks and the related standards such as e.g. 3GPP RAN (Third Generation Partnership Project Radio Access Network) or GRAN (GSM Radio Access Network) may evolve to provide enhanced performance, services and accessibility. Enhanced performance, services and accessibility may be obtained by defining a new type of radio cell within the communications standard of the RAN (Radio Access Network). In the following, standard type radio cells conforming with an existing communications standard of a RAN will be referred to as "traditional" radio cells. Analogously, standard type mobile/base stations will be termed "traditional" mobile/base stations. Newly defined radio cells of a second type will be referred to as "new generation" radio cells in the following. Analogously, second type mobile/base stations operable in the new generation radio cells will be termed "new generation" mobile/base stations of the RAN.

One aspect is to evolve a wide area communication radio network employing traditional radio cells by the implementation of a fixed local area communication network. This fixed local area communication network may employ the new generation radio cells. The wide area communication radio network may be any mobile communication network or RAN providing for wide area coverage. Specific examples of wide area communication radio networks are GSM (Global System for Mobile communications), GRAN, GERAN (GSM EDGE RAN), LTE (Long Term Evolution), CDMA2000 and IS95 (Interim Standard 95), UMTS (Universal Mobile Telecommunications System), UTRAN (UMTS Terrestrial RAN) etc. Traditional base stations of such wide area communication radio networks are often termed NodeB. The fixed local area communication network may provide for short-range connectivity within a small distance of up to e.g. about 50 m or even only 20 m. Such short-range radio cells are also referred to as Femto Cells (FCs). FCs established by new generation base stations may in particular be devised for home or indoor use.

Converging local and wide area mobile radio networks may be attractive for various reasons. Indoor coverage may be improved at a lower cost, high-speed and flexible data services may be supported, mobile network capital expenditure may be lowered by diverting indoor mobile traffic through the fixed mobile radio network, the network QoS (Quality of Service) may be improved by interference reduction, more attractive tariff plans may be developed, easier access for end-users may be provided and a number of other improvements could be achieved.

Convergence of local and wide area mobile radio networks can be achieved by modifying or evolving the wide area mobile radio network to integrate or embed the fixed local radio network into the wide area mobile radio network. In this case, the new generation base stations can be considered as "additional" new base stations of the wide area mobile radio network.

According to one embodiment of the invention, the new generation base stations have specific properties. Typically, these specific properties may result in new generation base stations that do not fully comply with the stringent specifications required for traditional base stations. Thus, new generation base stations, though being operationally integrated into the wide area mobile radio network, typically may have reduced standard compatibility. In other words, in one embodiment, FCs having decreased transmission signal quality requirements and optionally new functionality are integrated in a pre-existing wide area mobile radio network.

Further, if a pre-existing RAN is evolved to include new generation base stations, new generation mobile stations may be made available. In one embodiment, these new generation UEs may support the new base station's functionality, i.e. may provide for specific procedures implemented to exploit some or all of the new base station's functionality, if any. Further, the new generation UEs in one embodiment are able to cope with the "low quality" transmissions of the new generation base stations, i.e. with base station transmissions having at least partly reduced transmission requirements compared to the requirements stipulated in the pre-existing wide area mobile radio network standard.

Lowering the transmission quality requirements for specific base stations (namely the new generation base stations) in a wide area mobile radio network creates the risk of reduced performance or even failure of legacy mobile stations (i.e. legacy UEs). In particular, during initial cell search and acquisition, legacy UEs may try to obtain adjustment information from the new generation base stations and may adapt to settings which could be beyond operational limits of the legacy UEs. For instance, the reference clock of a legacy UE could be detuned during initial cell search and acquisition with a new generation base station. Reference frequency detuning or readjustments of other settings could even be irreversible in the sense that valid settings can not be recovered during a subsequent cell search or acquisition procedure in a traditional radio cell. In other words, allowing "relaxed" transmission quality requirements to new generation base stations embedded into a pre-existing wide area network communications standard could impact the downward compatibility of the evolved network.

FIG. 1 illustrates a mobile communication radio network 10 comprising a wide area communication radio network and a fixed local area communication radio network. Base station 1 is a traditional base station being part of the wide area communication radio network and defines a "normal" or traditional wide area radio cell. Base station 2 is a new generation base station being part of the fixed local area communication radio network and defines a new generation radio cell, e.g. a FC. The fixed local area communication radio network is embedded or integrated in the wide area communication radio network as explained above.

FIG. 1 further illustrates a new generation UE 3 and a legacy UE (mobile station) 4. The legacy UE 4 comprises frontend circuitry FE 4.1 and a search unit 4.2. Likewise, the new generation UE 3 comprises frontend circuitry FE 3.1 and a search unit 3.2.

The traditional base station 1 broadcasts at least one first acquisition code 5 in a listening channel of the wide area communication radio network. This acquisition code is typically stipulated in the standard of the pre-existing wide area communication radio network and is known in both UEs 3, 4. The new generation base station 2 broadcasts at least one second acquisition code 6. The second acquisition code 6 also is broadcast over the listening channel of the wide area communication radio network. Typically, the listening channel is associated with specific resources (such as e.g. a specific carrier frequency or a specific code multiplexing scheme) defined in the physical layer specifications of the wide area communication radio network standard. In other words, the first and second acquisition codes are usually broadcast by using the same resources. The second acquisition code 6 is typically stipulated in an updated standard of the wide area communication radio network which is amended by the introduction of the stipulations relating to the local area communication radio network. The second acquisition code is known in the new generation UE 3 and is different from the first acquisition code(s) broadcasted by the traditional base station 1.

Both UEs 3, 4 perform a search procedure (e.g. initial cell search) to locate and identify detectable base stations. As will be explained later in more detail, in the traditional or legacy UE 4, one or more first code sequences corresponding to the one or more known acquisition codes 5 are correlated to a received signal transmitted over the air interface and processed in the frontend circuitry 4.1. In the new generation UE 3, the first code sequence(s) corresponding to the pre-existing first acquisition code(s) 5 and at least one second code sequence corresponding to the at least one second acquisition code 6 are correlated to a received signal transmitted over the air interface and processed in the frontend circuitry 3.1.

Figure 2:
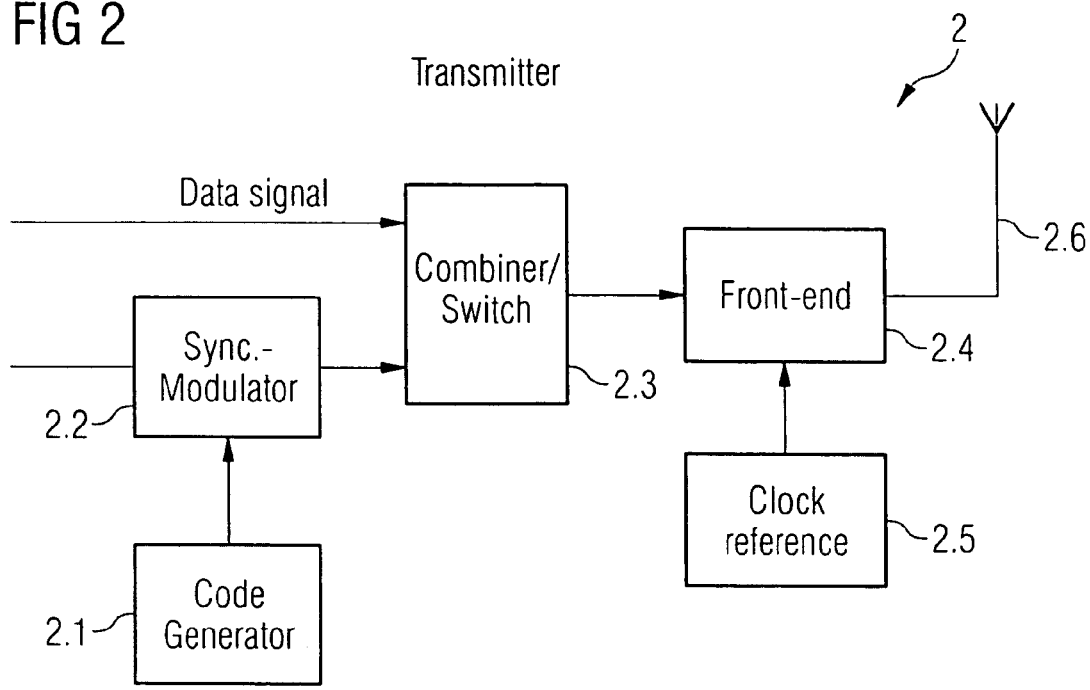
FIG. 2 is a block diagram of a radio transmitter of a base station.

FIG. 2, in more detail, illustrates an exemplary functional block diagram of a transmitter of a new generation base station 2. The transmitter may comprise a code generator 2.1, a synchronization modulator 2.2, a combiner 2.3, a frontend circuitry 2.4, a clock reference 2.5 and a transmission antenna 2.6. The code generator 2.1 generates the at least one second acquisition code. To this end, the code generator 2.1 may use a feedback shift register with tap circuitry. Further or alternatively, the code generator 2.1 may comprise a look-up table memory (not shown) in which the second acquisition code (or a plurality of second acquisition codes) is stored.

In one embodiment, the second acquisition code may be passed to the synchronization modulator 2.2. The synchronization modulator 2.2 maps the second acquisition code to symbols (not shown) and bursts. The second acquisition code, e.g. represented by symbols mapped to a burst structure, is then passed to a combiner or switch 2.3. The combiner or switch 2.3 may cause the second acquisition code to be superimposed on other signals such as a user data signal. The combiner or switch 2.3 passes the second acquisition code to the frontend circuitry 2.4 of the transmitter. The frontend circuitry 2.4 typically provides for up-conversion, amplification and filtering, i.e. shifts the second acquisition code into an RF (Radio Frequency) regime by using a pre-defined RF carrier frequency and amplifies and filters the up-converted signal. The pre-defined carrier frequency may be generated based on a frequency signal output by the local clock reference 2.5 of the base station. The up converted, amplified and filtered signal is emitted to the air interface by antenna 2.6.

The transmitter of the new generation base station 2 may have specifications partly deviating from stipulations required by the wide area communication radio network standard. All standards underlying wide area mobile radio networks require the (traditional) base stations to satisfy specifications related to the quality of the transmitted signal in view of e.g. output power dynamics, frequency error, spectral transmission mask, spurious emissions or co-channel interference, signal-to-noise ratio (SNR), etc. These requirements increase the cost of equipment. While a relative high expenditure for traditional base stations 1 is considered to be acceptable because of their potential to reduce UE cost, new generation base stations 2 are consumer electronics sold to the end-user and are thus expected to be attractive only if they are available at low cost.

By way of example, new generation base station 2 may be allowed to have a clock frequency error larger than the maximum frequency error allowed to traditional base stations 1. For instance, 3GPP requires (traditional) base stations 1 to have a frequency stability of clock generation within ±0.05 ppm compared to the nominal clock generation frequency fixed in the 3GPP standard. Such high frequency stability can only be guaranteed by expensive approaches such as the application of GPS (Global Positioning System) clock control, the use of expensive high quality reference quartz or the implementation of an additional DL RX module for synchronizing to neighboring base stations. Similar considerations apply to the other transmission quality requirements mentioned above.

Thus, the clock reference 2.5 may provide for a frequency error greater than that stipulated in the wide area mobile radio communication network standard. The amplifier (not shown) in the frontend circuitry 2.4 may provide for output power dynamics worse than stipulated in the wide area mobile radio networks standard, and the filter (not shown) in the frontend circuitry 2.4 may provide for a spectral transmission mask and/or co-channel interference failing to meet the stringent requirements of the wide area mobile radio communication network standard.

Figure 3:
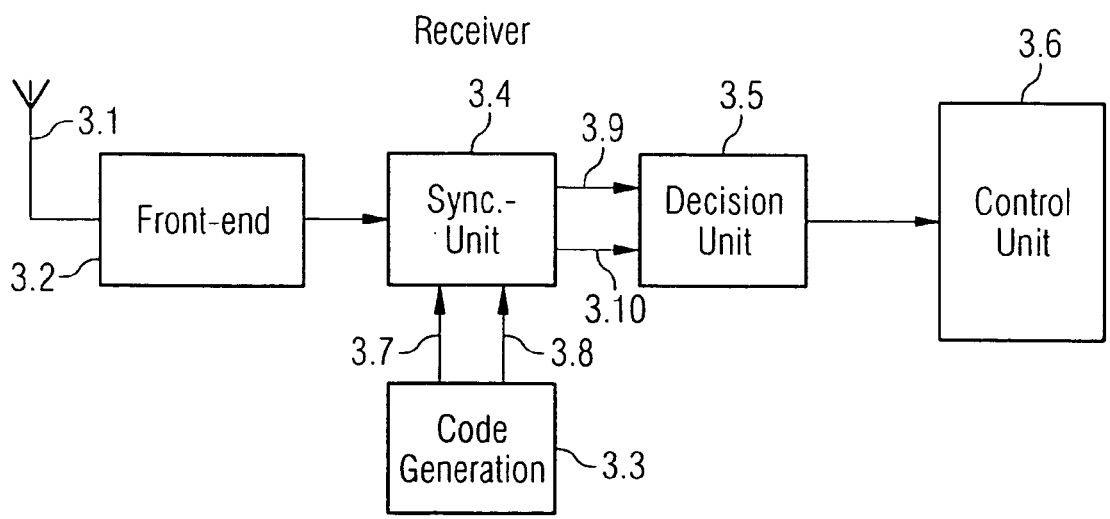
FIG. 3 is a block diagram of a radio receiver of a mobile station.

FIG. 3 illustrates an exemplary functional block diagram of a receiver of a new generation UE 3. The receiver may comprise a receive antenna 3.1, a frontend circuitry 3.2, a code generator 3.3, a synchronization unit 3.4, a decision unit 3.5 and a control unit 3.6. A radio signal output by the air interface is received by the receive antenna 3.1 and fed to the frontend unit 3.2. The frontend unit 3.2 provides for channel filtering, amplification and frequency down-conversion. The down-converted signal, which may be a baseband signal or an IF (Intermediate Frequency) signal, is passed to the synchronization unit 3.4 which is connected to the code generator 3.3. The code generator 3.3 generates or provides at least two code sequences, namely a first code sequence corresponding to the first acquisition code and a second code sequence corresponding to the second acquisition code. These code sequences are supplied via connections 3.7 and 3.8 to the synchronization unit 3.4. The first and second code sequences may be identical to the first and second acquisition code sequences used in the traditional and new generation base stations, respectively, or may be derived from these code sequences by basic computation such as e.g. by complex conjugation etc.

The synchronization unit 3.4 comprises a correlation unit (not shown) configured to generate a first correlation response by correlating the received down-converted signal to the first code sequence and to generate a second correlation response by correlating the received down-converted signal to the second code sequence. The first correlation response is output at connection 3.9 and the second correlation response is output at connection 3.10. The correlation unit may be implemented at least partly in hardware and may e.g. comprise one (multiplexed) or multiple hardware correlators.

The first and second correlation responses are computed during a search procedure or cell scan. Such search procedures or cell scans are performed during an initial cell search or during cell monitoring (e.g. when neighboring cells are repeatedly searched during communication). Both correlation responses are supplied to the decision unit 3.5. The decision unit 3.5 analyzes the first and second correlation responses and decides which type of radio cell is present.

Figure 4A:
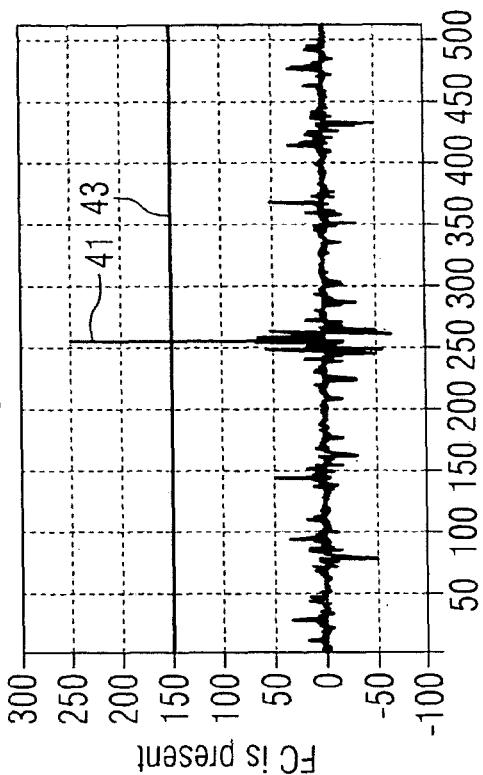
FIGS. 4A-4D are graphs in which correlation response strength is plotted versus time.

More specifically, FIG. 4A illustrates the first correlation response generated in a new generation UE 3 if a traditional radio cell is present. Signal strength is plotted versus time (in arbitrary units). At the time the down-converted signal matches the first code sequence, a peak 40 shows up in the first correlation response. The position of the peak 40 on the time scale may be used in one embodiment as a basis for time synchronization between the new generation UE 3 and the traditional base station 1.

Figure 4B:
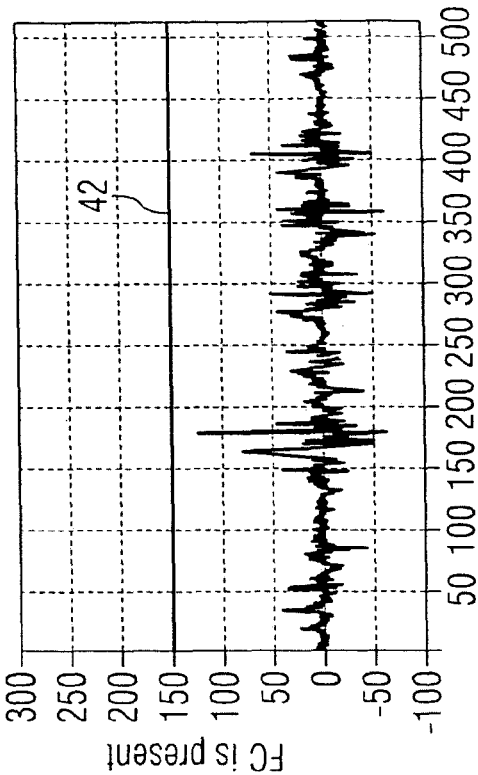

FIG. 4B illustrates in a similar representation the second correlation response generated in a new generation UE 3 if an FC is present. Analogously, at the time the down-converted signal matches the second code sequence, a peak 41 shows up in the second correlation response, and the position of the peak 41 on the time scale in one embodiment may be used as a basis for time synchronization between the new generation UE 3 and the new generation base station 1.

In one embodiment, the decision unit 3.5 compares the first and second correlation responses with a first and a second detection threshold 42 and 43 respectively. The detection thresholds 42, 43 may have identical or different values. The decision unit 3.5 decides a traditional cell is present if a peak 40 of the corresponding correlation response exceeds the detection threshold 42 and decides a new generation radio cell is present if a peak 41 of the corresponding correlation response exceeds the detection threshold 43.

Depending on the result of the decision unit 3.5, the new generation UE 3 may be operated in different modes. If both a traditional radio cell and an FC are present, the decision unit 3.5 may decide to initiate a new connection to the FC or relocate or hand-over an existing connection with a traditional cell to the FC. In this case, the decision unit 3.5 outputs a mode signal to the control unit 3.6 indicating that the receiver of the new generation UE 3 shall operate in a first mode. In the first mode, the receiver takes into account the "quality deficiency" of the signal transmitted by the new generation transmitter 2. For instance, the receiver provides for a signal processing in the frontend unit 3.2 which is more tolerant to frequency variations, spectral transmission mask failures, power variations or other transmission quality shortcomings to be expected when a signal of the new generation base station 2 is to be processed.

Figure 4C:
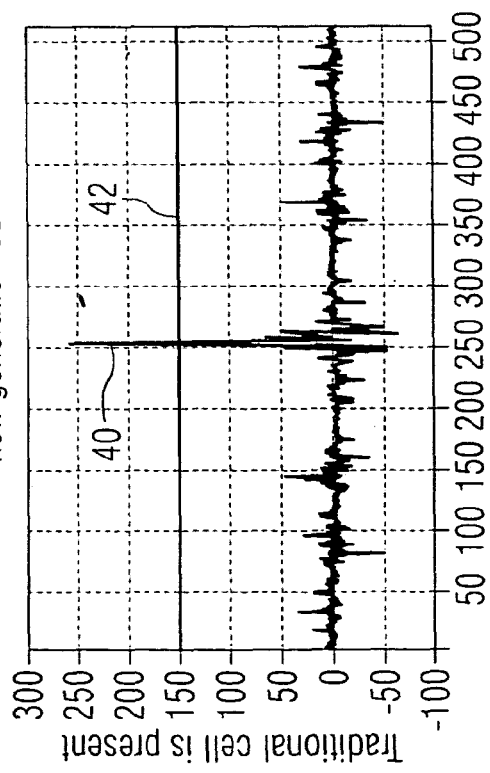

The design of a traditional UE 4 is similar to the design of the new generation UE 3 in view of the antenna 3.1, the synchronization unit 3.4 and the code generator 3.3. However, only first code sequences associated with traditional base stations 1 are generated by the code generator of a traditional UE 4. FIG. 4C illustrates the correlation response generated in a traditional UE 4 if a traditional radio cell is present. Thus, FIG. 4C is similar to FIG. 4A. If a peak 40 of the correlation response exceeds the detection thresholds 42, the traditional UE 4 identifies a traditional base station 1.

Figure 4D:
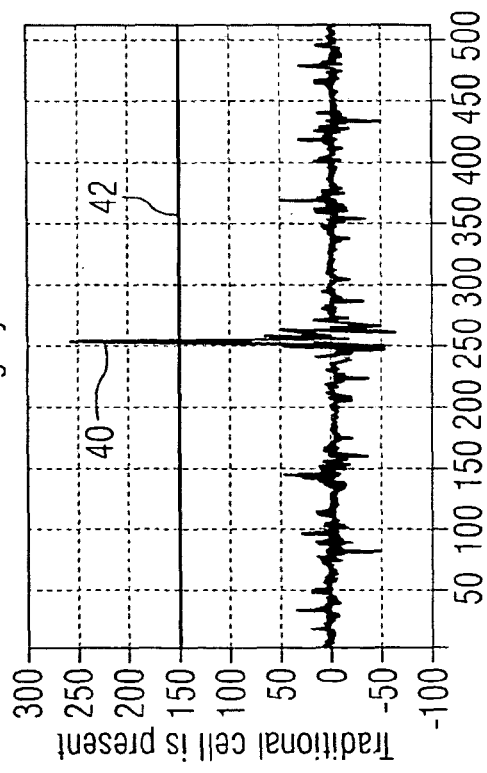

FIG. 4D illustrates the correlation response generated in a traditional or legacy UE 4 if only an FC is present. As the base station of an FC emits an acquisition code which is statistically uncorrelated or even orthogonal to all acquisition codes used by traditional base stations, the legacy UE 4 does not detect this code sequence. That is, the correlation response as shown in FIG. 4D does not exceed the detection threshold 42.

It is to be noted that in one embodiment the new generation UE 3 and the legacy UE 3 listen into the same "traditional" listening channel during the cell search procedure. Thus, the UEs 3, 4 may apply the same down-conversion shift, and the down-converted signals in UEs 3, 4, if located in the same position during the cell search procedure, may be identical.

As already mentioned, the second acquisition code is different than the first acquisition code and is designed such that a new generation receiver can unambiguously decide whether a traditional cell, an FC, or both cells, are present. On the other hand, in one embodiment, basic properties of these two codes should remain the same. For instance, the sequence length, the kind of the code (i.e. code type or code class), the code start and/or end time within the timing of the data structure and the encoded information such as reference information or system information of the RAN may remain the same for the first and second acquisition codes. Thus, the general synchronization procedure in one embodiment is not altered and the hardware in the synchronization unit 3.4 may be the same for legacy and new generation UEs.

By way of example, assume that FCs having reduced transmission quality requirements (and possibly enhanced functionality) will be implemented in Release n (say e.g. n=8) of e.g. the 3GPP standard. In this case, legacy UEs according to a preceding Release (say e.g. Release 5) of the 3GPP standard should be prevented from being negatively affected by the FCs taking part in the extended network. This can be achieved in the aforementioned way, i.e. by assigning a specific acquisition code to FCs which is not detected during usual acquisition procedures in legacy UEs. That way, legacy UEs are automatically excluded from the additional functionality provided by FCs. However, they are not excluded from participation in the enhanced wireless communication network and remain operable therein.

Generally, both the first and second acquisition codes should have good auto-correlation properties (in order to provide for a high peak in case of correlation) and should have good cross-correlation properties (in order to avoid erroneous cell detection (false alarm) in a traditional UE 4 in the presence of an FC.

In the following, various examples of RANs in which embodiments of the invention may be implemented are given. In UMTS initial cell detection is accomplished by using the so-called primary synchronization channel (PSC). FIG. 5 illustrates the channel structure in the UMTS standard. A UMTS frame comprises 15 slots (#0, #1, ..., #14). Each slot may contain 2560 chips. The chip time duration in the UMTS standard is 0.26 μs. Consequently, the slot time duration is 0.67 ms, and the frame duration is 10 ms.

Two UMTS channels are involved in the synchronization of a UE to a traditional base station, specifically the synchronization channel SCH and the common pilot channel CPICH. The synchronization channel SCH comprises a first synchronization channel P-SCH (primary synchronization channel) and a second synchronization channel S-SCH (secondary synchronization channel). At the start of each slot, a traditional base station in each case transmits the same sequence of 256 chip in the P-SCH. The receiver is synchronized to the slot timing by detection of this sequence (which may also be referred to as the symbol of the P-SCH), which is known to all receivers. At the start of each slot, the traditional base station further transmits a sequence of 256 chips in the S-SCH. These sequences are different to each other and are used to identify the code group from which the scrambling code used in the CPICH originates. Finally, after code group identification, the receiver of the UE identifies the scrambling code on the basis of the CPICH.

According to the 3GPP RAN1 Specification TS 25.213, Chapter 5.2.3., the primary synchronization code (PSC) is a so-called generalized hierarchical Golay sequence defined by $$a = <x_1, x_2, x_3, \ldots, x_{16}> = <1,1,1,1,1,1,-1,-1,1,-1,1,-1, 1,-1,-1,1> \quad (1)$$

$$C_{PSC} = (1+j) \times <a,a,a,-a,-a,a,-a,-a,a,a,a,-a,a,-a,a,a> \quad (2)$$

where j is the imaginary unit. Equation (2) defines 256 chips of the (first) acquisition code sequence used in traditional UMTS base stations. This sequence is illustrated in FIG. 6A and referred to by PSC.

A second acquisition code sequence used by new generation base stations of FCs may be defined by $$a = <x_1, x_2, x_3, \ldots, x_{16}> = <1,-1,-1,1,-1,1,-1,1,-1,-1, 1,1,1,1,1,1> \quad (3)$$

$$C_{nPSC} = (1+j) \times <a,a,-a,a,-a,a,a,a,-a,-a,a,-a,-a,a,a,a> \quad (4)$$

This new primary synchronization code (nPSC) also contains 256 chips, i.e. has the same length as the PSC. Further, the time position within the time slot is the same as with the PSC. The nPSC encodes the same information (namely the slot timing) as the PSC and is formed in an equivalent manner. Further, basically the same synchronization procedure could be used to detect the (traditional) PSC and the (new) nPSC.

Further, it should be noted that the second acquisition sequence nPSC defined by equation (4) may be generated by substantially the same code generation structure as the traditional PSC of equation (2). As known in the art, a recursive shift register equipped with a tap mask may be used to generate such sequences, and the only modification to be made relates to the seed (i.e. the initial content of the shift register) and/or the tap mask to be used when generating the second acquisition code sequence according to equation (4). Thus, in one embodiment, the second acquisition code may be generated with the same shift register used for the generation of the first acquisition code. Alternatively, the same look-up table may be used for the generation of the first and second acquisition codes.

As a further example, an LTE RAN is considered. Similar to UMTS, LTE uses a primary synchronization channel for initial cell detection. Different to UMTS, LTE defines three primary synchronization codes. In other words, a traditional base station in LTE may emit one of these three code sequences as a primary synchronization code. Details are outlined in the LTE standard 3GPP RAN1 specification TS 36.211. The primary acquisition codes are based on a Zadoff-Chu sequence according to $$d_u(n) = \begin{cases} e^{-j\frac{\pi u n(n+1)}{63}} & n = 0,1,\ldots,30 \\ e^{-j\frac{\pi u(n+1)(n+2)}{63}} & n = 31,32,\ldots,61 \end{cases} \quad (5)$$

The three primary acquisition codes are provided by the choice of three base indices u. In LTE a set of indices u={25, 29, 34} is defined. In order to extend LTE to include FC, it may be sufficient to define one or more further second acquisition code sequences, for instance by u=23. This fourth acquisition code sequence will then be exclusively used by new generation base stations in FCs. Another possibility is to define more than one second acquisition code sequences. By way of example, a second set of base indices u={x1, x2, x3} could be specified in order to define three additional acquisition code sequences which are exclusively used by new generation base stations.

In addition, while a particular feature or aspect of an embodiment of the invention may have been disclosed with respect to only one of several implementations, such feature or aspect may be combined with one or more other features or aspects of the other implementations as may be desired and advantageous for any given or particular application.

Although specific embodiments have been illustrated and described, it will be appreciated by one of ordinary skill in the art that any arrangement which is calculated to achieve the same purpose may be substituted for the specific embodiment shown. It is to be understood that the above description is intended to be illustrative and not restrictive. The application is intended to cover any variations of the invention. The scope of the invention includes any other embodiments and applications in which the above structures and methods may be used. The scope of the invention should therefore be determined with reference to the appended claims along with the scope of equivalence to which such claims are entitled.

It is emphasized that the abstract is provided to comply with 37 CFR. Section 1.72(b) requiring an abstract that will allow the reader to quickly ascertain the nature and gist of a technical disclosure. It is submitted with the understanding that it will not be used to interpret or limit the scope of meaning of the claims.

What is claimed is:

1. A base station operable in a local area communication radio network within the coverage of a wide area communication radio network, wherein the wide area communication radio network uses a listening channel for acquisition, comprising:
a code generator configured to generate an acquisition code;
a modulator configured to modulate the acquisition code onto an acquisition signal to be broadcast by the base station,
wherein the acquisition signal is broadcast over the listening channel of the wide area communication radio network,
wherein the acquisition code is different from all acquisition codes used by the wide area communication radio network; and a local clock reference having a tolerance in frequency larger than the maximum frequency tolerance stipulated for base stations of the wide area communication radio network.

2. The base station of claim 1, wherein the acquisition code is of the same code type as an acquisition code used in the wide area communication radio network.

3. The base station of claim 1, wherein the acquisition code is of the same code length as an acquisition code used in the wide area communication radio network.

4. The base station of claim 1, wherein the acquisition code is uncorrelated or orthogonal to an acquisition code used in the wide area communication radio network.

5. A mobile station operable in a wide area communication radio network and in a local area communication radio network, comprising:
  a code generator configured to generate a first code sequence and a second code sequence, wherein the first code sequence corresponds to a first acquisition code known to be broadcast by base stations of the wide area communication radio network, and the second code sequence corresponds to a second acquisition code known to be broadcast by base stations of the local area communication radio network;
  a correlator configured to generate a first correlation response by correlating a received signal with the first code sequence, and generate a second correlation response by correlating the received signal with the second code sequence; and
  an evaluation unit coupled to the correlator and configured to determine whether one of the first and second acquisition codes are detected in the received signal based on an evaluation of the first and second correlation responses.

6. The mobile station of claim 5, further comprising:
  a control unit configured to control a receiver circuit in the mobile station to operate in a first mode or in a second mode based on the determination of the evaluation unit whether one of the first and second acquisition codes are detected.

7. The mobile station of claim 5, further comprising:
  a down-conversion unit configured to convert a received radio frequency antenna signal to the received signal, wherein a frequency shift applied by the down-conversion unit is independent of whether the first acquisition code or the second acquisition code is to be detected in the received signal.

8. The mobile station of claim 5, wherein the code generator comprises at least one shift register configured to generate the first code and the second code, or comprises at least one look-up table configured to store therein the first code and the second code.

9. The mobile station of claim 5, wherein the first code and the second code are of the same code type.

10. The mobile station of claim 5, wherein the first code and the second code are of the same code length.

11. The mobile station of claim 5, wherein the first code and the second code are uncorrelated or orthogonal with respect to one another.

12. The mobile station of claim 5, wherein, if the evaluation unit detects the second acquisition code, the control unit controls the receiver circuit to account for tolerances in frequency of the received signal which are greater than the maximum admissible tolerances in frequency of signals broadcasted by a base station of the wide area communication radio network.

13. A mobile communication radio network comprising:
  a wide area communication radio network;
  at least one first base station operable in the wide area communication radio network, wherein the first base station is configured to broadcast a first acquisition code in a listening channel of the wide area communication radio network;
  a local area communication radio network;
  at least one second base station operable in the local area communication radio network, wherein the second base station is configured to broadcast a second acquisition code different from the first acquisition code in the listening channel of the wide area communication radio network;
  at least one first mobile station configured to listen into the listening channel and operate in different operation modes based on whether the first or second acquisition code has been detected in the listening channel;
  the first base station has a local clock reference having a first maximum frequency tolerance;
  the second base station has a local clock reference having a second maximum frequency tolerance; and
  the second maximum frequency tolerance is larger than the first maximum frequency tolerance.

14. The mobile communication radio network of claim 13, further comprising:
  at least one second mobile station configured to listen into the listening channel, wherein the second mobile station is configured to detect only first acquisition codes.

15. The mobile communication radio network of claim 13, wherein the first acquisition code and the second acquisition code are of the same code type.

16. The mobile communication radio network of claim 13, wherein the first acquisition code and the second acquisition code are of the same code length.

17. The mobile communication radio network of claim 13, wherein the first acquisition code and the second acquisition code are uncorrelated or orthogonal with respect to one another.

18. A method of operating a mobile communication radio network comprising a wide area communication radio network and a local area communication radio network, the wide area communication radio network and the local area communication radio network both using the same listening channel for base station acquisition, comprising:
  broadcasting a first acquisition code in the listening channel with base stations operable in the wide area communication radio network;
  broadcasting a second acquisition code different from the first acquisition code in the listening channel with base stations operable in the local area communication radio network;
  listening into the listening channel and operating in different operation modes with at least one first mobile station based on whether the first or second acquisition code has been detected in the listening channel; and
  wherein base stations operable in the local area communication radio network are allowed to use local clock references having a larger frequency tolerance than the maximum frequency tolerance allowed for base stations operable in the wide area communication radio network.

* * * * *